(12) United States Patent
Hayashi

(10) Patent No.: US 6,650,913 B1
(45) Date of Patent: Nov. 18, 2003

(54) MOBILE TELEPHONE UNIT AND METHOD USED IN THIS UNIT FOR ACCESSING INTERNET SITE

(75) Inventor: Keiichi Hayashi, Kanagawa (JP)

(73) Assignee: NEC Corporation, Tokyo (JP)

( * ) Notice: Subject to any disclaimer, the term of this patent is extended or adjusted under 35 U.S.C. 154(b) by 433 days.

(21) Appl. No.: 09/667,696

(22) Filed: Sep. 22, 2000

(30) Foreign Application Priority Data

Sep. 22, 1999 (JP) .......................................... 11/267932

(51) Int. Cl.$^7$ ................................................ H04Q 7/20
(52) U.S. Cl. .................... 455/575.3; 455/550; 455/556; 455/556.1
(58) Field of Search ......................... 455/90, 550, 556, 455/557, 556.1, 575.3

(56) References Cited

U.S. PATENT DOCUMENTS 5,953,413 A * 9/1999 Peyer .......................... 379/433
6,332,024 B1 * 12/2001 Inoue ..................... 379/433.06
6,332,084 B1 * 12/2001 Shaanan ..................... 455/556

FOREIGN PATENT DOCUMENTS

| JP | 10-224288 | 8/1998 |
|---|---|---|
| JP | 2833964 | 10/1998 |
| JP | 11-96113 | 4/1999 |

* cited by examiner

*Primary Examiner*—William Trost
*Assistant Examiner*—Brandon J Miller
(74) *Attorney, Agent, or Firm*—McGinn & Gibb, PLLC (57) ABSTRACT

Upon detection of a change in the state of the cover part and the body part from open to close by the box open/close detecting part of a mobile telephone unit, the controlling part controls the mobile telephone unit so as to connect to a pre-specified Internet site which the user uses frequently, if any; upon detection of a change in the state of the cover part from open to close, the controlling part releases the connection to the Internet site to which the mobile telephone unit is presently connected, if any.

23 Claims, 5 Drawing Sheets

MOBILE TELEPHONE UNIT AND METHOD USED IN THIS UNIT FOR ACCESSING INTERNET SITE

BACKGROUNDS OF THE INVENTION

1. Field of the Invention

The present invention relates to a mobile telephone unit and a method used in this unit for accessing an Internet site. In particular, the present invention relates to a folding mobile telephone unit that enables the user to capture an HTML (hypertext markup language) file from a Web server, analyze the file, and view the results of the analysis.

2. Description of the Related Art

In conventional types of folding mobile telephone unit, the telephone body generally consists of two parts, the body part and the cover part, which are joined together via a hinge mechanism or the like, thereby allowing the body part and the cover part to be folded into one piece.

When this type of folding mobile telephone unit is in use, the cover part is unfolded from the body part; when not in use, the body part and the cover part can be folded into one piece for greater ease of carriage. This type of mobile telephone unit was disclosed in Japanese Patent No. 2833964.

Some of folding mobile telephone units as described above have browser functions, which the user can use for capturing an HTML file from a Web server, analyzing the HTML file, and viewing the results of the analysis of the HTML file on the terminal display part.

The aforementioned conventional folding mobile telephone unit has browser functions, which enable the user to analyze an HTML file captured from a Web server and view the results of the analysis of the HTML file on the terminal display part. This unit, however, does not offer the capability to connect to an Internet site or release the connection automatically in synchronization with the unfolding or folding operation of the boxes.

Thus, with the conventional folding mobile telephone unit, connection to an Internet site or release of the connection upon completion of access to an Internet site must be performed by the user with the boxes opened through key operation, based on his or her judgment of the necessity to connect or release the connection. When accessing an Internet site that the user visits frequently, this means that the user must conduct the same access procedure as accessing other sites, which in turn means a lower operability.

SUMMARY OF THE INVENTION

The object of the present invention is to provide a mobile telephone unit and a method used in this unit for accessing an Internet site, which can eliminate the above-mentioned problem and reduce the amount of operations requiring user intervention, by performing automatically the operations that are required when accessing a frequently-visited Internet site, such as selecting and determining the site to be accessed, in synchronization with the unfolding or folding operation of the boxes.

According to the first aspect of the invention, a mobile telephone unit including the cover part that can be unfolded or folded freely from or onto the body part and functions for accessing an Internet site, comprises an open/close detecting means for detecting the unfolding and folding operations of the cover part, and a controlling means for controlling connection and release of the connection to the Internet site in accordance with the results of detection by the open/close detecting means;

In the preferred construction, the controlling means connects to a pre-specified Internet site upon detection of a change in the state of the cover part from close to open by the open/close detecting means.

In another preferred construction, the controlling means releases the connection to the Internet site to which the mobile telephone unit is connected upon detection of a change in the state of the cover part from open to close by the open/close detecting means.

In another preferred construction, the controlling means connects to a pre-specified Internet site if the open/close detecting means detects a change in the state of the cover part from close to open, and releases the connection to the Internet site to which the mobile telephone unit is presently connected upon detection of a change in the state of the cover part from open to close by the open/close detecting means.

According to the second aspect of the invention, a method for accessing an Internet site for use in a mobile telephone unit including a cover part that can be unfolded or folded freely from or onto the body part and functions for accessing Internet sites, comprising the steps of detecting the unfolding and folding operations of the cover part, and controlling connection and release of the connection to the Internet site in accordance with the results of the detection.

In the preferred construction, the step of controlling connection and release of the connection connects to a pre-specified Internet site upon detection of a change in the state of the cover part from close to open.

In another preferred construction, the step of controlling connection and release of the connection releases the connection to the Internet site to which the mobile telephone unit is presently connected upon detection of a change in the state of the cover part from open to close.

In another preferred construction, the step of controlling connection and release of the connection connects to a pre-specified Internet site upon detection of a change in the state of the cover part from close to open, and releases the connection to the Internet site to which the mobile telephone unit is presently connected upon detection of a change in the state of the cover part from open to close.

According to another aspect of the invention, a computer readable memory storing an Internet site access control program for use in a mobile telephone unit including a cover part that can be unfolded or folded freely from or onto the body part and functions for accessing Internet sites, wherein the Internet site access control program, comprising the steps of detecting the unfolding and folding operations of the cover part, and controlling connection and release of the connection to the Internet site in accordance with the results of the detection.

In order to achieve this object, the present invention provides a folding mobile telephone unit having browser functions for capturing an HTML file on the server, analyzing the captured HTML file, and displaying the results of the analysis of the HTML file on the terminal display part, with the capability to automatically connect to a pre-specified Internet site or release the connection in synchronization with the unfolding or folding operation of the boxes.

More specifically, a mobile telephone unit according to the present invention reduces the amount of operations that the user is required to perform when connecting to an Internet site, by allowing the user to specify the URL of an Internet site that he or she will access frequently, accessing automatically such Internet site upon the unfolding of the boxes, and disconnecting automatically from such Internet site upon the folding of the boxes.

Thus, it will become possible to reduce the amount of operations requiring user intervention, because the user can access the Internet site that he or she accesses frequently using the mobile telephone simply by unfolding the boxes, and release the connection simply by folding the boxes. Furthermore, since access to an Internet site or release of the connection are conducted automatically simply by unfolding or folding the boxes, the user will be freed from the key pressing operation for connection or release of the connection.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
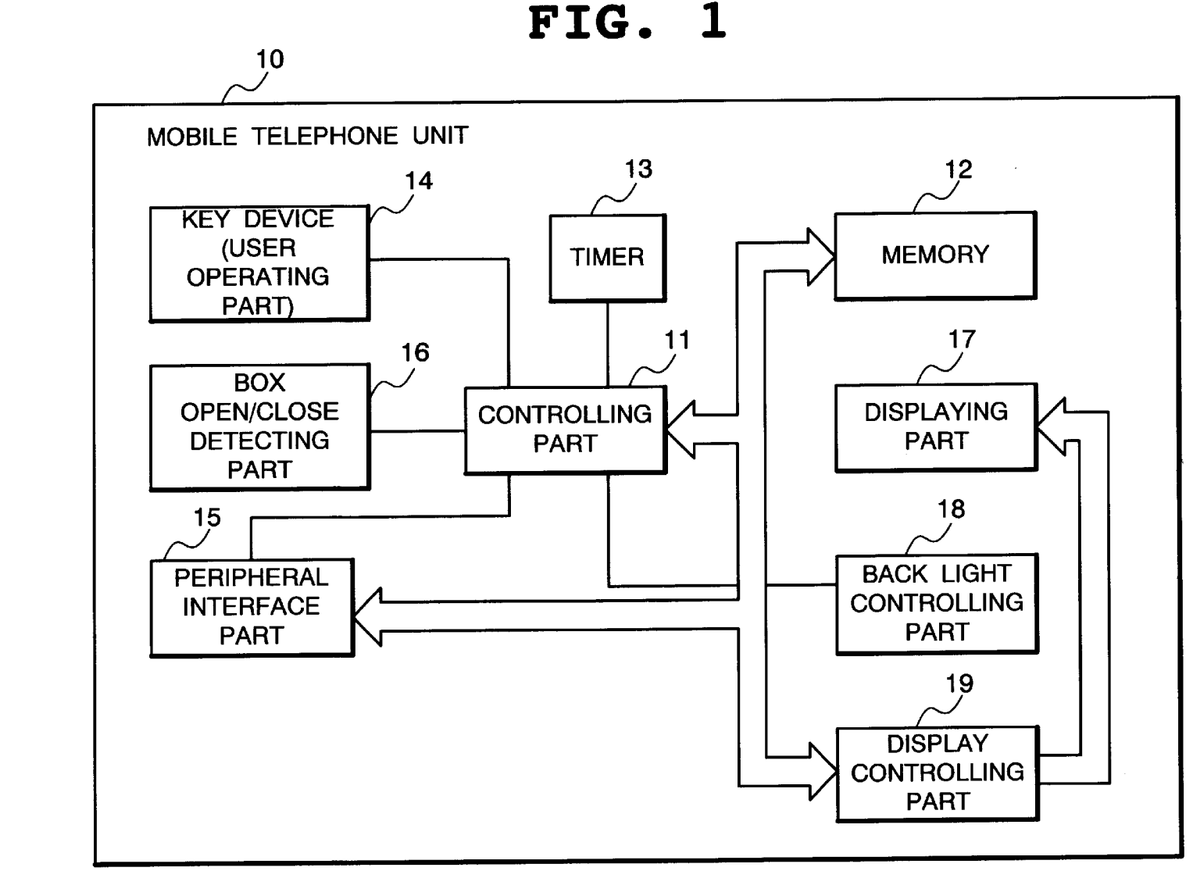
FIG. 1 is a block diagram showing the configuration of a mobile telephone unit according to one embodiment of the present invention.

FIG. 1 is a block diagram showing the configuration of a mobile telephone unit according to one embodiment of the present invention. As shown in FIG. 1, a mobile telephone unit 10 comprises a controlling part 11, a memory 12, a timer 13, a key device (user controlling part) 14, a peripheral interface part 15, a box open/close detecting part 16, a displaying part 17, a display back light controlling part 18, and a display controlling part 19. The cover part box is so structured as to allow the user to unfold or fold from or onto the body part box.

Figure 2:
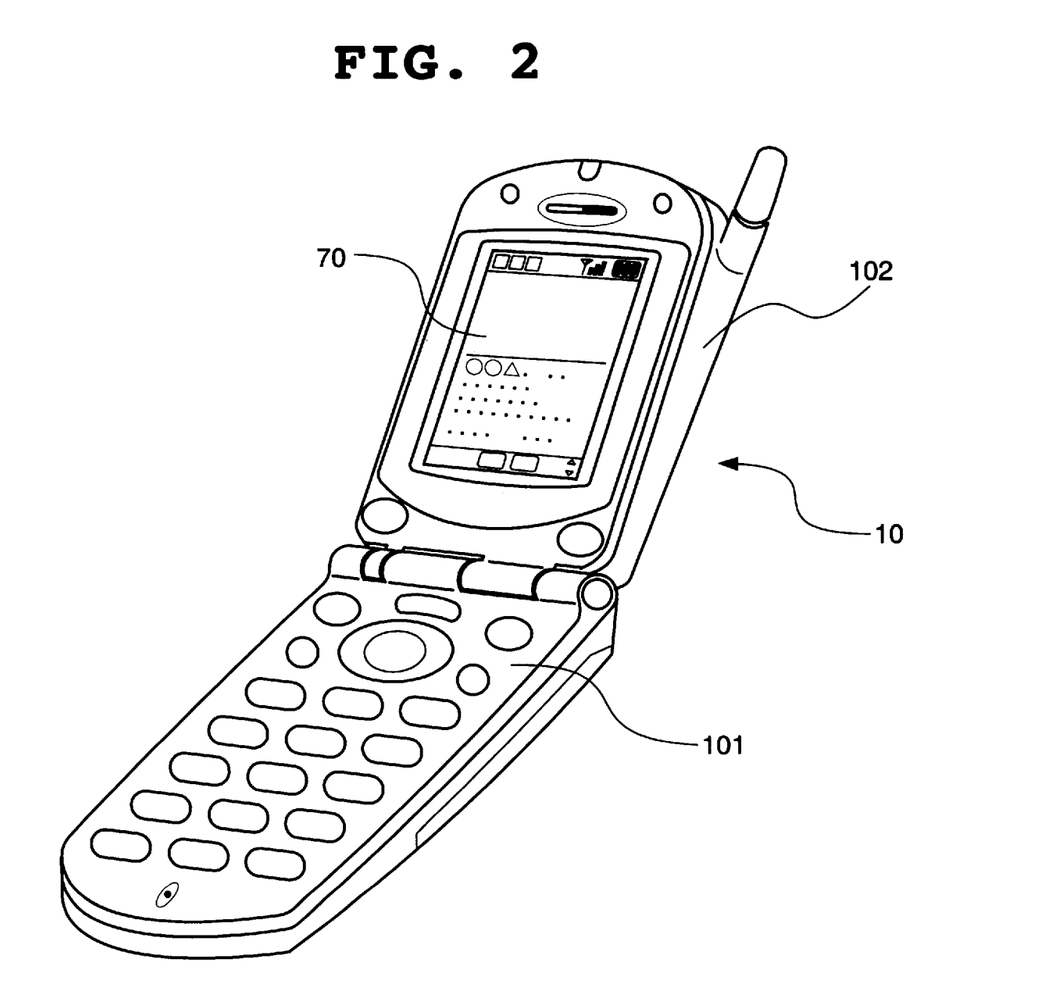
FIG. 2 is an oblique perspective illustration showing one example of mobile telephone unit according to one embodiment of the present invention.

FIG. 2 shows an example of the mobile telephone unit 10. The mobile telephone unit 10 in this figure consists of two parts, the body part 101 and the cover part 102, which are joined together via a hinge mechanism or the like, thereby allowing the body part 101 and the cover part 102 to be folded into one piece. On the body part 101 side, various buttons are provided for different operations. On the cover part 102 side, the displaying part 17 using liquid crystal is provided. It should be noted that the shape and other features of the mobile telephone unit 10 shown in FIG. 2 are presented merely as an example.

Figure 3:
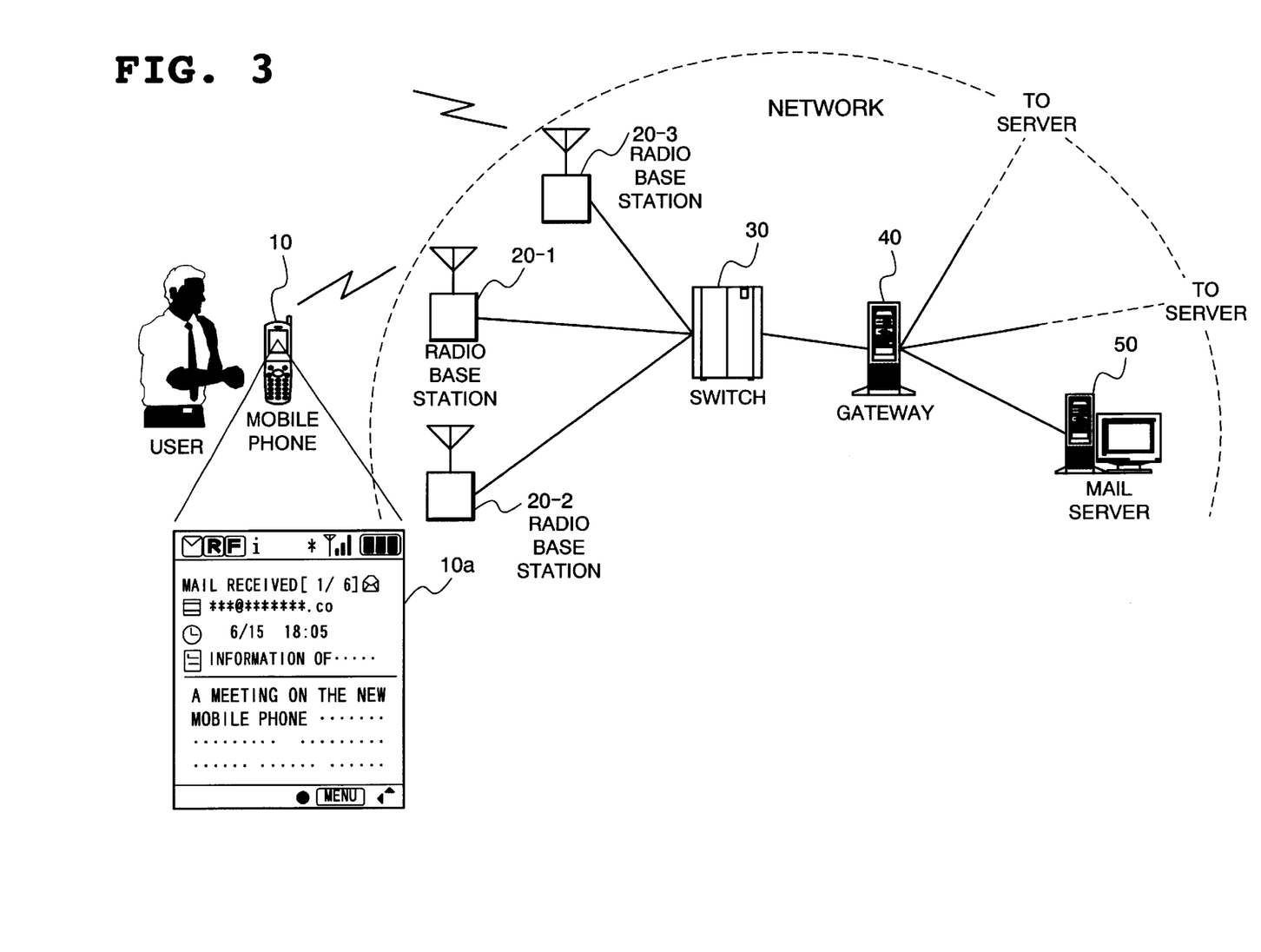
FIG. 3 is a block diagram showing the system topology of a mobile telephone unit according to one embodiment of the present invention.

FIG. 3 is a block diagram showing the system topology of a mobile telephone unit according to one embodiment of the present invention. As shown in FIG. 3, the mobile communication according to one embodiment of the present invention includes a mobile telephone unit 10, a radio base stations 20-1 through 20-3, a switch 30, a gateway 40, and a mail server 50. 10a shows an example of a displaying part 17 of the mobile telephone unit 10.

Figure 4:
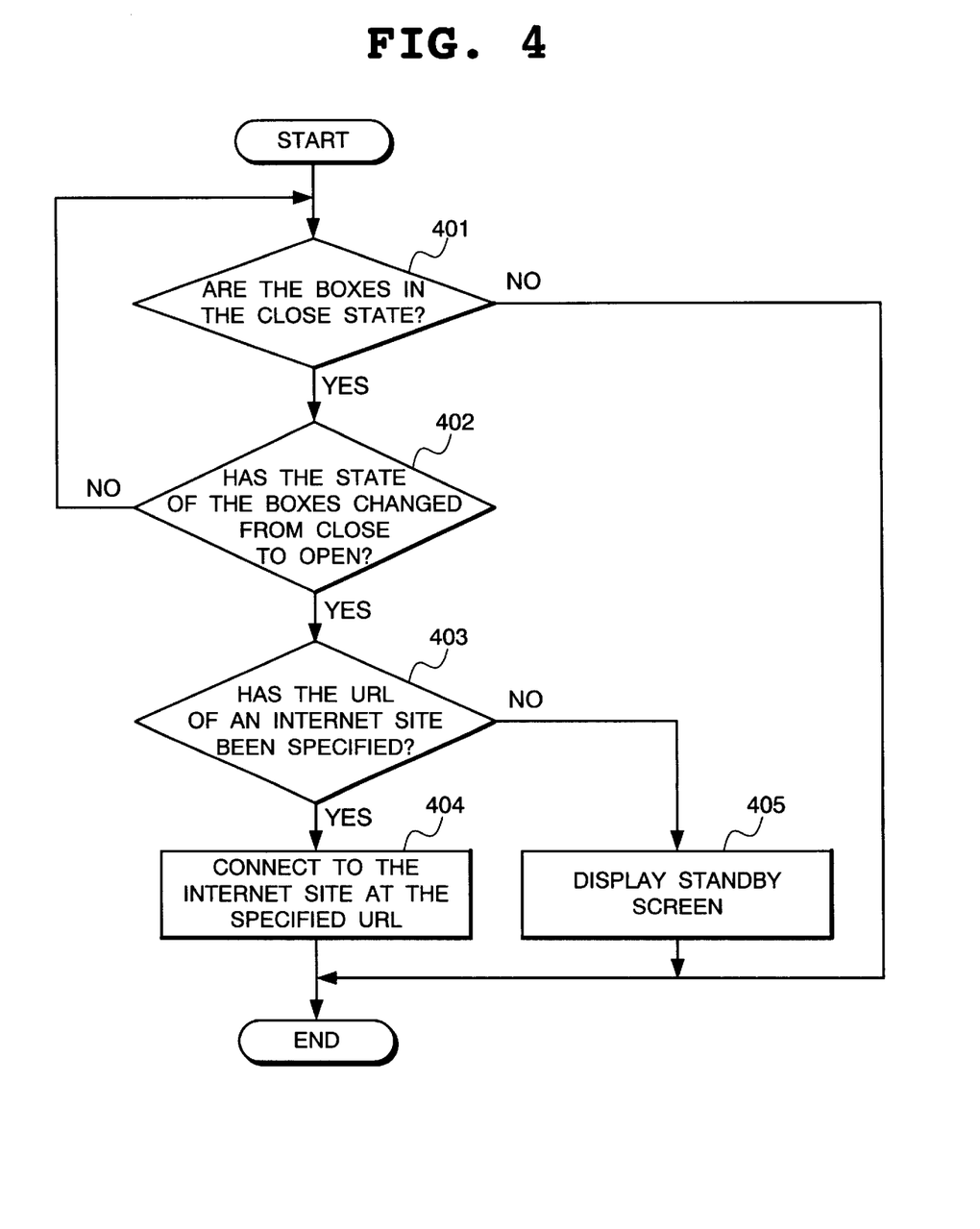
FIG. 4 is a flow chart showing the operation of automatic connection control in a mobile telephone unit according to one embodiment of the present invention.
Figure 5:
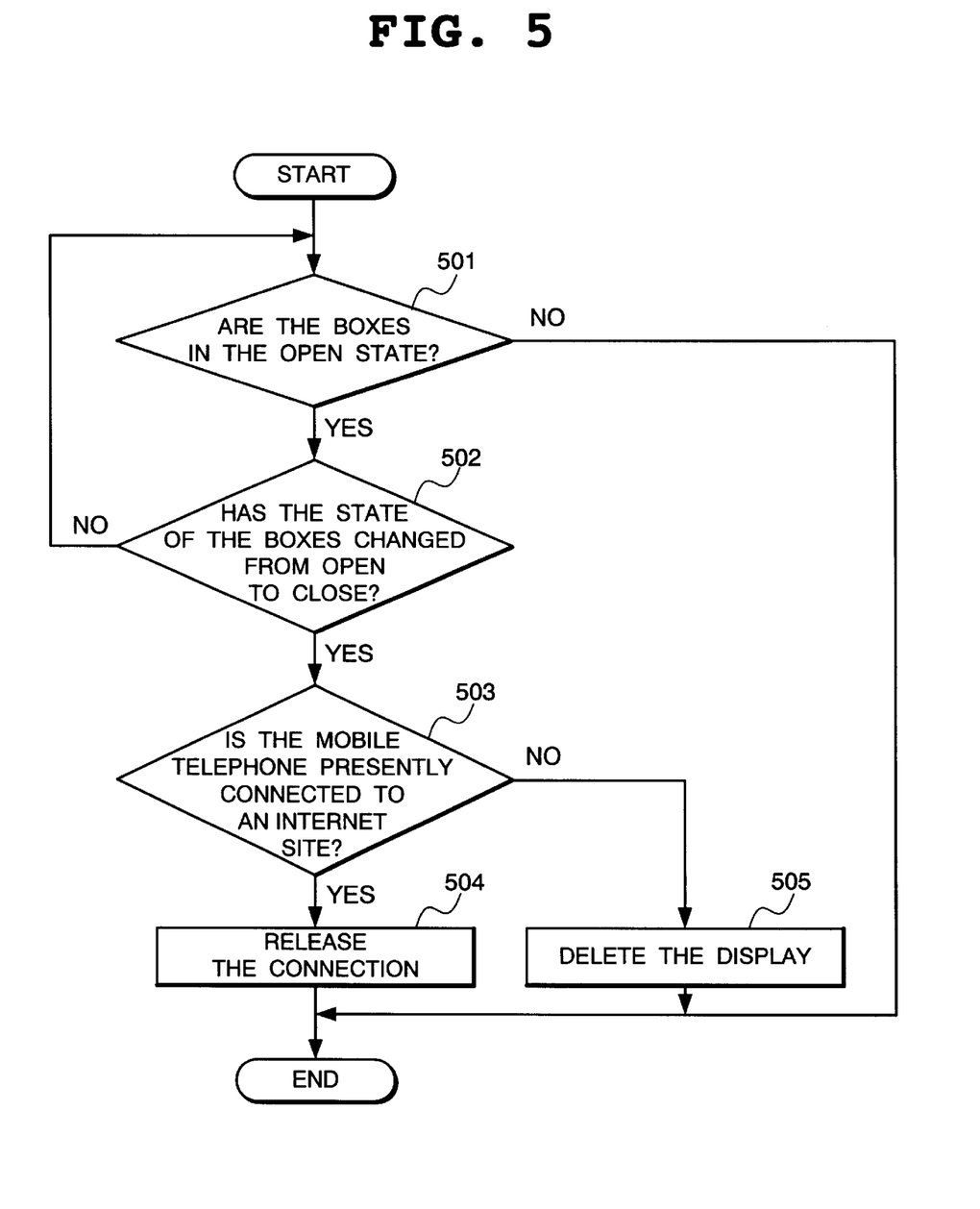
FIG. 5 is a flow chart showing the operation of automatic disconnection control in a mobile telephone unit according to one embodiment of the present invention.

FIG. 4 is a flow chart showing the operation of automatic connection control in the mobile telephone unit 1 according to one embodiment of the present invention. FIG. 5 is a flow chart showing the operation of automatic disconnection control in the mobile telephone unit 1 according to one embodiment of the present invention. The operation of the mobile telephone unit 1 according to one embodiment of the present invention will now be described with reference to FIGS. 1 to 5.

The processing operations shown in FIGS. 4 and 5 are performed when the individual parts of the mobile telephone unit 10 execute an Internet site access control program that is stored in a computer readable memory (not shown). This computer readable memory may be implemented using a ROM (read only memory), an IC, a memory, or the like.

The mobile telephone unit 10 has browser functions, and can capture an HTML file from the mail server (Web server) 50, analyze the captured HTML file, and display the results of the analysis of the HTML file on the displaying part 17. When performing these actions, the mobile telephone unit 10 uses the browser functions for capturing an HTML file from the mail server (Web server) 50 on the network via the gateway 40, the switch 30, and the radio base station 20-1.

The mobile telephone unit 10 stores in the memory 12 the HTML file on the Web site that it has captured from the mail server 50 and displays it on the displaying part 17. The display screen 10a shown in FIG. 3 is an example of display.

When performing automatic control of connection to the Internet site, the box open/close detecting part 16 of the mobile telephone unit 10 first checks whether the box of the body part and the cover part box are presently in the open or close state (Step 401 in FIG. 4). If it determines that the boxes are in the close state, the box open/close detecting part 16 further checks whether the state of the boxes has changed from close to open as a result of the subsequent operation by the user (Step 402 in FIG. 4).

If the box open/close detecting part 16 determines that the state of the boxes has changed from close to open, then the controlling part 11 checks whether the URL of a frequently-accessed Internet site has been specified (Step 403 in FIG. 4).

If the URL of a frequently-accessed Internet site has been specified, the controlling part 11 controls the operation so that connection to the specified URL will be made automatically (Step 404 in FIG. 4) and terminates the automatic connection process.

If the URL of a frequently-accessed Internet site has not been specified, the controlling part 11 controls the display controlling part 19 to display the standby screen on the displaying part 17 (Step 405 in FIG. 4) and terminates the automatic connection process.

When performing automatic control of disconnection from the Internet site, the box open/close detecting part 16 of the mobile telephone unit 10 first checks whether the body part box and the cover part box are now in the open or close state (Step 501 in FIG. 5). If it determines that the boxes are in the open state, the box open/close detecting part 16 further checks whether the state of the boxes has changed form open to close as a result of the subsequent operation by the user (Step 502 in FIG. 5).

If the box open/close detecting part 16 determines that the state of the boxes has changed from open to close, then the controlling part 11 checks whether the user is presently connected to an Internet site (Step 503 in FIG. 5).

If the user is presently connected to an Internet site, the controlling part 11 disconnects automatically the connection to the Internet site (Step 504 in FIG. 5) and terminates the automatic disconnection process.

If the user is not connected to an Internet site, the controlling part 11 controls the display controlling part 19 so that the display on the displaying part 17 will be deleted (Step 505 in FIG. 5) and terminates the automatic disconnection process.

Some conventional folding mobile telephone unit have browser functions for capturing an HTML file on a Web server, analyzing the captured HTML file, and displaying the results of the analysis of the HTML file on the terminal display part. These units, however, do not offer the capability to connect to the URL of an Internet site specified in the mobile telephone or release the connection automatically in synchronization with the unfolding or folding operation of the boxes.

Thus, with the conventional folding mobile telephone units, access to an Internet site or release of the connection upon completion of access to an Internet site must be performed by the user with the boxes in the open state through key operation, based on his or her judgment of the necessity to access or release the connection. When accessing an Internet site that the user visits frequently, this means that the user must conduct the same access procedure as accessing other sites, which in turn means a lower operability.

The present embodiment solves these problems by allowing the user to specify the URL of an Internet site in the mobile telephone 10 and to control automatically access and disconnection to and from that URL in synchronization with the unfolding or folding operation of the boxes.

Thus, it will become possible to reduce the amount of operations requiring user intervention, because the user can access the Internet site that he or she accesses frequently using the mobile telephone 10 simply by unfolding the boxes, and release the connection simply by folding the boxes.

The above-described embodiment according to the present invention relates to a folding mobile telephone unit in which the body part box and the cover part box can be unfolded and folded freely. It should be noted that, similarly to the above-described embodiment according to the present invention, automatic access to an Internet site and disconnection from that site is possible in a mobile telephone unit that is provided with a flipper by performing automatic access and disconnection to and from the Internet site in synchronization with the unfolding and folding of the flipper.

Furthermore, other aspects of the present invention are possible in relation to the descriptions of the claims herein.

(a) The first aspect of the present invention provides a mobile telephone unit including a flipper that covers the body box and can be unfolded or folded freely and functions for accessing Internet sites, wherein said mobile telephone unit has an open/close detecting means for detecting the unfolding or folding operation of the flipper and a controlling means for controlling connection and release of the connection to the Internet site in accordance with the results of detection by the open/close detecting means.

(b) The second aspect of the present invention provides a mobile telephone unit, wherein the controlling means is so configured as to connect to a pre-specified Internet site if the open/close detecting means detects a change in the state of the flipper from close to open.

(c) The third aspect of the present invention provides a mobile telephone unit, wherein the controlling means is so configured as to release the connection to the Internet site to which the mobile telephone unit is connected if the open/close detecting means detects a change in the state of the flipper from open to close.

(d) The fourth aspect of the present invention provides a method for accessing an Internet site for use in a mobile telephone unit including a flipper that covers the body box and can be unfolded or folded freely and functions for accessing Internet sites, wherein said method has a step of detecting the unfolding or folding operation of the flipper and a step of controlling connection and release of the connection to the Internet site in accordance with the results of said detection.

(e) The fifth aspect of the present invention provides a method for accessing an Internet site for use in a mobile telephone unit, wherein a step of connecting and releasing the connection connects to a pre-specified Internet site upon detection of a change in the state of the flipper from close to open.

(f) The sixth aspect provides a method for accessing an Internet site for use in a mobile telephone unit, wherein the step of connecting and releasing the connection releases said connection to the Internet site to which the mobile telephone unit is connected upon detection of a change in the state of the flipper from open to close.

(g) The seventh aspect of the present invention provides a computer readable memory for storing an Internet site access control program for use in a mobile telephone unit including a flipper that covers the body box and can be unfolded or folded freely and functions for accessing Internet sites, wherein said program enables the mobile telephone unit to detect the unfolding and folding operations of the flipper and to control connection and release of the connection to an Internet site in accordance with the results of said detection.

As described in the foregoing, the present invention provides a mobile telephone unit including the cover part that can be unfolded or folded freely from and onto the body part and functions for accessing an Internet site, with the capability to perform automatically the operations that are required when accessing a frequently-visited Internet site, such as selecting and determining the site to be accessed, in synchronization with the unfolding or folding operation of the boxes, by controlling connection and release of the connection to the Internet site in accordance with the results of detecting the unfolding and folding operations of the cover part, thereby achieving the effects that the amount of operations requiring user intervention is reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A mobile telephone unit including the cover part that can be unfolded or folded freely from or onto the body part and functions for accessing an Internet site, comprising:
    an open/close detecting means for detecting the unfolding and folding operations of the cover part; and
    a controller for controlling connection and release of the connection to said Internet site in accordance with the results of said detecting by said open/close detecting means.

2. The mobile telephone unit as set forth in claim 1, wherein said controlling means connects said mobile telephone unit to a pre-specified Internet site upon detection of a change in the state of said cover part from close to open by said open/close detecting means.

3. The mobile telephone unit as set forth in claim 1, wherein said controlling means releases the connection to the Internet site to which the mobile telephone unit is connected upon detection of a change in the state of said cover part from open to close by said open/close detecting means.

4. The mobile telephone unit as set forth in claim 1, wherein said controlling means connects to a pre-specified Internet site if said open/close detecting means detects a change in the state of said cover part from close to open,
    wherein said controlling means releases the connection to the Internet site upon detection of a change in the state of said cover part from open to close by said open/close detecting means.

5. A method for accessing an Internet site for use in a mobile telephone unit, including a cover part that can be unfolded or folded freely from or onto a telephone unit body part and functions for accessing an Internet site, comprising:
    detecting the unfolding and folding operations of the cover part; and
    controlling connection and release of the connection to said Internet site in accordance with the results of the detection.

6. A method for accessing an Internet site for use in a mobile telephone unit as set forth in claim 5, wherein said controlling connection and release of the connection connects to a pre-specified Internet site upon detection of a change in the state of said cover part from close to open.

7. A method for accessing an Internet site for use in a mobile telephone unit as set forth in claim 5, wherein said controlling connection and release of the connection releases the connection to the Internet site to which the mobile telephone unit is presently connected upon detection of a change in the state of said cover part from open to close.

8. A method for accessing an Internet site for use in a mobile telephone unit as set forth in claim 5, wherein said controlling connection and release of the connection connects to a pre-specified Internet site upon detection of a change in the state of said cover part from close to open; and
    release the connection to the Internet site upon detection of a change in the state of said cover part from open to close.

9. A computer readable memory storing an Internet site access control program for use in a mobile telephone unit including a cover part that can be unfolded or folded freely from or onto the body part and functions for accessing Internet sites, wherein:
    said Internet site access control program comprises:
        detecting the unfolding or folding operations of the cover part; and
        controlling connection and release of the connection to said Internet site in accordance with the results of the detection.

10. A computer readable memory storing an Internet site access control program of a mobile telephone unit as set forth in claim 9, wherein
    said controlling the connection and release of the connection comprises connecting to a pre-specified Internet site upon-detection of a change in the state of said cover part from close to open.

11. A computer readable memory storing an Internet site access control program of a mobile telephone unit as set forth in claim 9, wherein said controlling connection and release of the connection comprises releasing the connection to the Internet site upon detection of a change in the state of said cover part from open to close.

12. A computer readable memory storing an Internet site access control program of a mobile telephone unit as set forth in claim 9, wherein said controlling connection and release of the connection comprises connecting to a pre-specified Internet site upon detection of a change in the state of said cover part from close to open; and
    releases the connection to the Internet site upon detection of a change in the state of said cover part from open to close.

13. The mobile telephone unit of claim 1, wherein said open/close detecting means detects a change in the unfolded or folded state of the cover part.

14. The mobile telephone unit of claim 1, wherein said controlling means connects said mobile telephone unit to said Internet site when said cover part changes from said folded state to said unfolded state.

15. The method of claim 5, wherein said detecting detects a change in the unfolded or folded state of the cover part.

16. A method of claim 5, wherein said controlling connects the mobile telephone unit to said Internet site upon detection of a change in the state of said cover part from close to open.

17. The method of claim 9, wherein said detecting detects a change in the unfolded or folded state of the cover part.

18. The method of claim 9, wherein said controlling connects the mobile telephone unit to said Internet site upon detection of a change in the state of said cover part from close to open.

19. A mobile telephone unit for accessing a network, comprising:
    a body comprising a display;
    a cover having a free end and an end attached to said body, wherein said cover folds away from said body in an open state and folds against said body in a closed state;
    a detector, operably connected to said cover, for detecting a change in said open and closed cover states; and
    a controller, operably connected to said body and said detector, for connecting said mobile telephone unit to said network when said detector detects the cover in an open state and for disconnecting said mobile telephone from said network when said detector detects said cover in a closed state.

20. The mobile telephone unit of claim 19, wherein said controller synchronizes said connecting of said mobile telephone unit to the Internet to said change in said open and closed cover states.

21. The mobile telephone unit of claim 19, wherein said controller determines if a universal resource locator (URL) of an Internet site is specified and automatically connects said telephone unit to said specified Internet site during said connecting said telephone unit to the Internet, and wherein said controller displays a standby screen on said display if the URL of an Internet site is not specified.

22. The mobile telephone unit of claim 19, wherein said detector sends a signal to said controller to indicate a change in said open and closed cover states.

23. The mobile telephone unit of claim 19, wherein said network comprises the Internet.

* * * * *